R. H. STROTHER.
COMPUTING MACHINE.
APPLICATION FILED APR. 14, 1916.

1,214,608.

Patented Feb. 6, 1917.
9 SHEETS—SHEET 1.

WITNESSES
E. M. Wells
L. Nelson

INVENTOR
Robert H. Strother
By James Felbel
HIS ATTORNEY

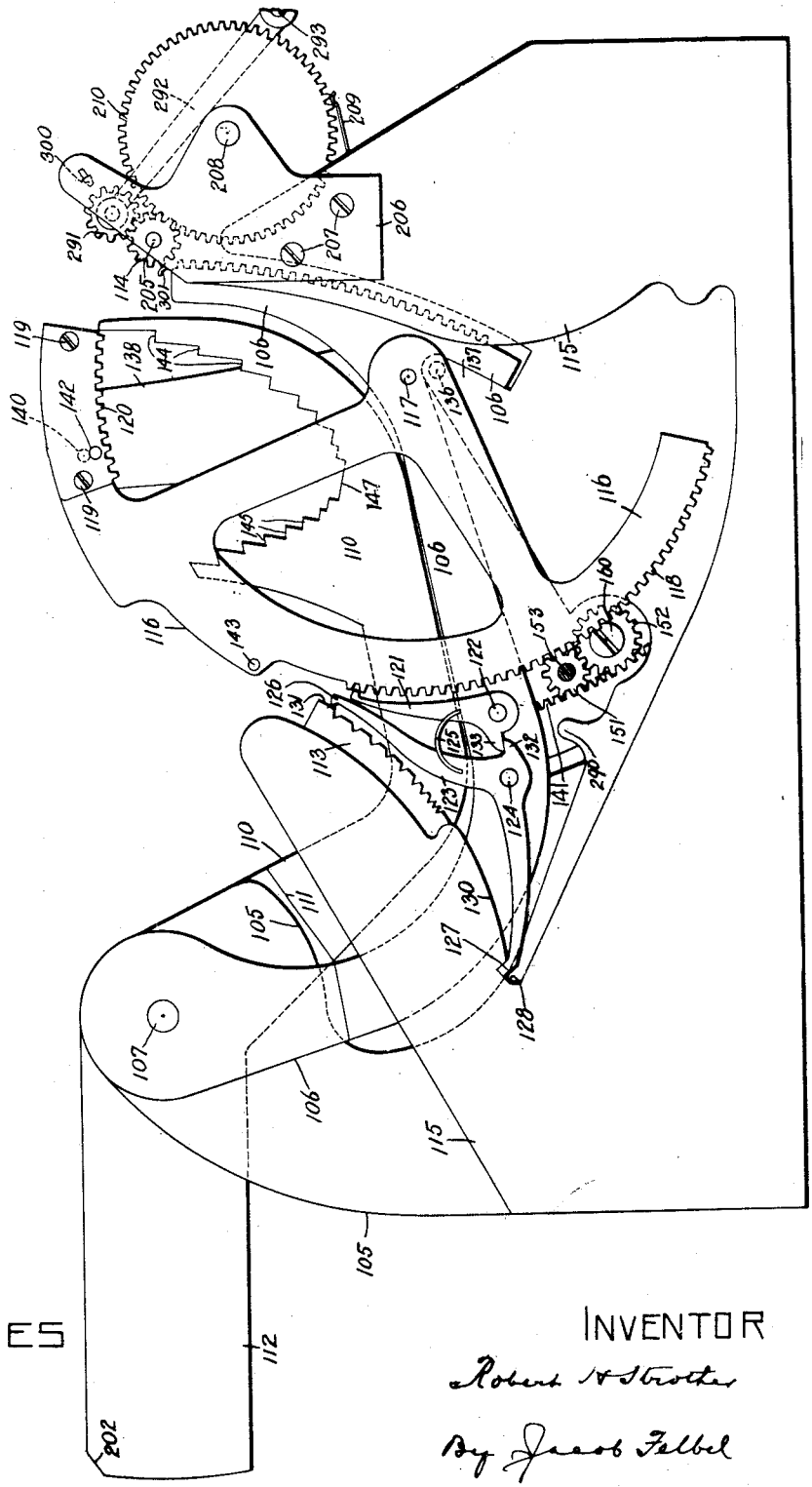

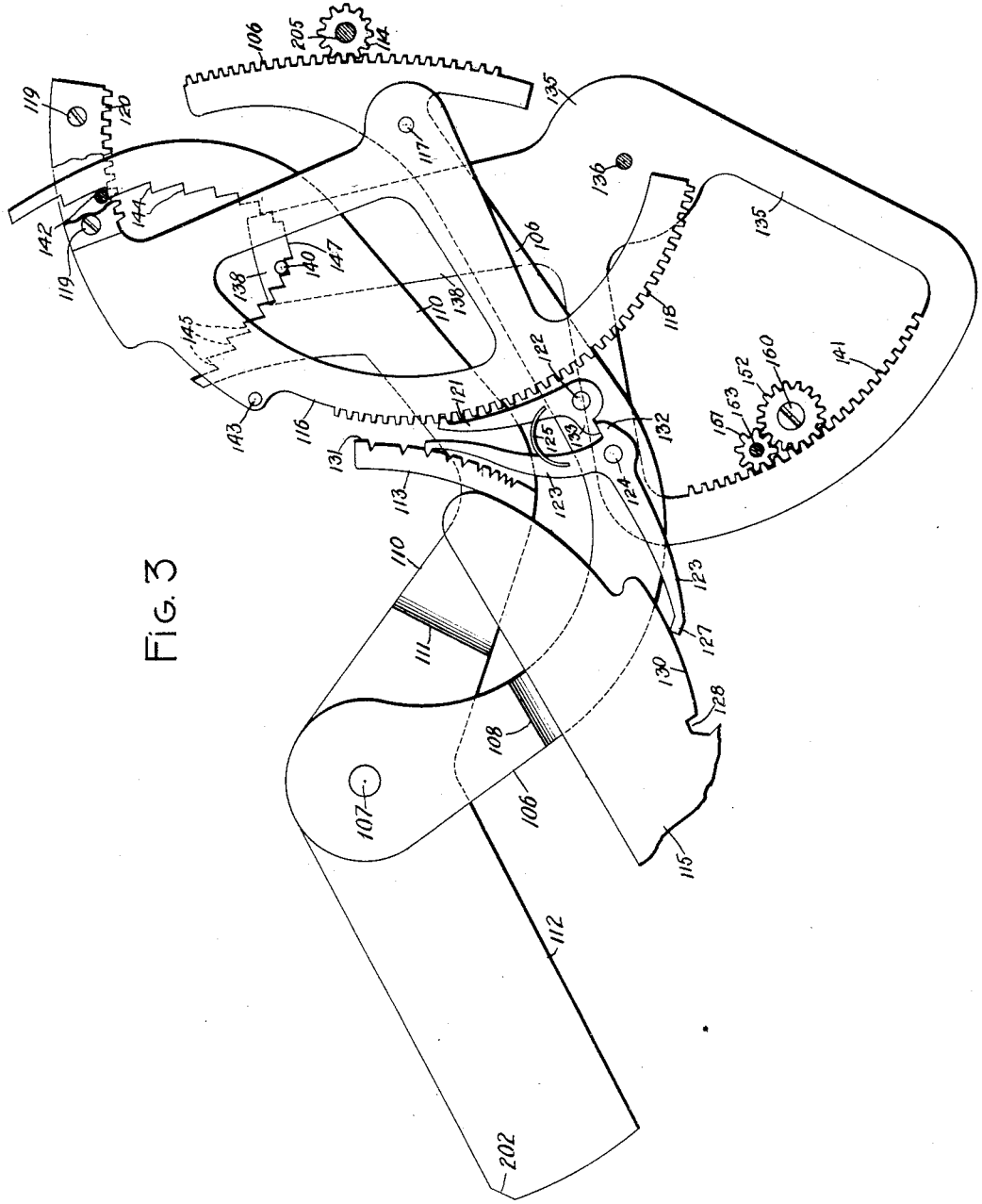

R. H. STROTHER.
COMPUTING MACHINE.
APPLICATION FILED APR. 14, 1916.

1,214,608.

Patented Feb. 6, 1917.
9 SHEETS—SHEET 4.

WITNESSES
E. M. Wells
L. Nelson.

INVENTOR
Robert H. Strother
By Jacob Felbel
HIS ATTORNEY

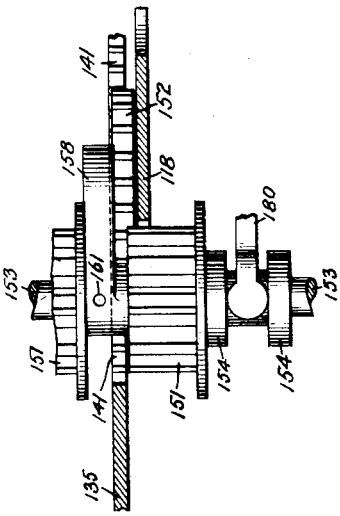

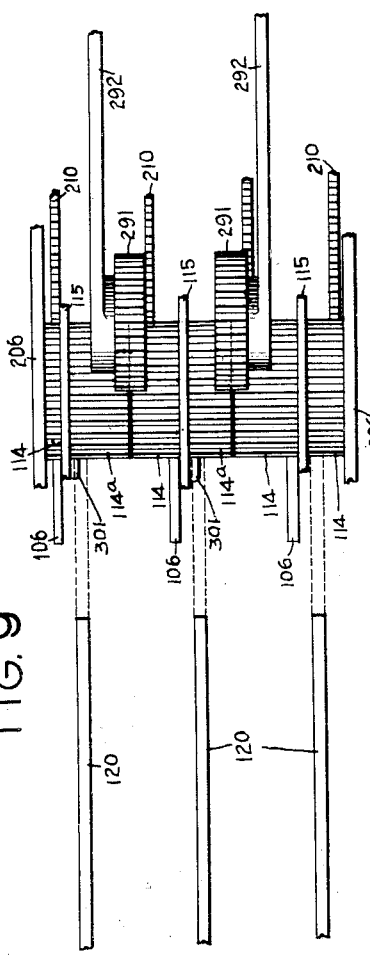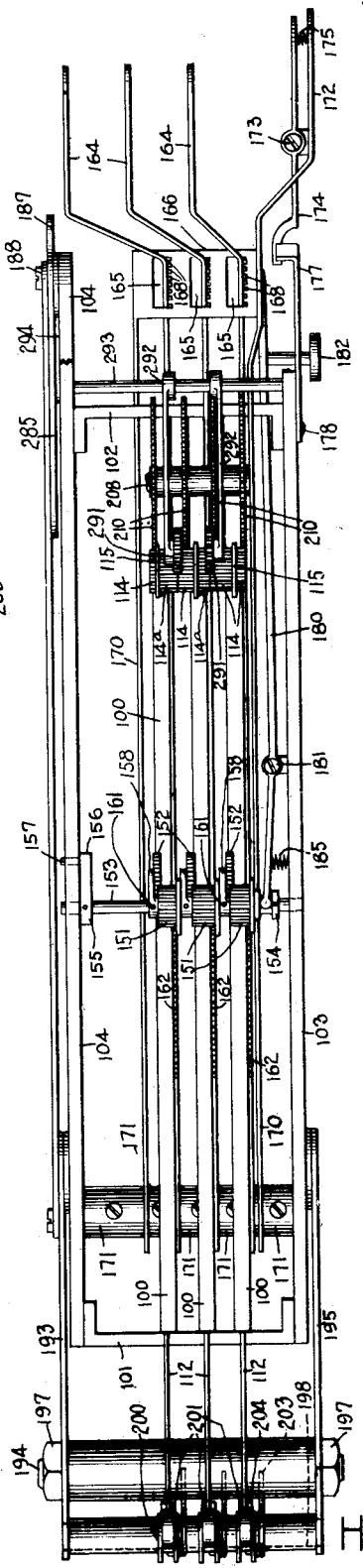

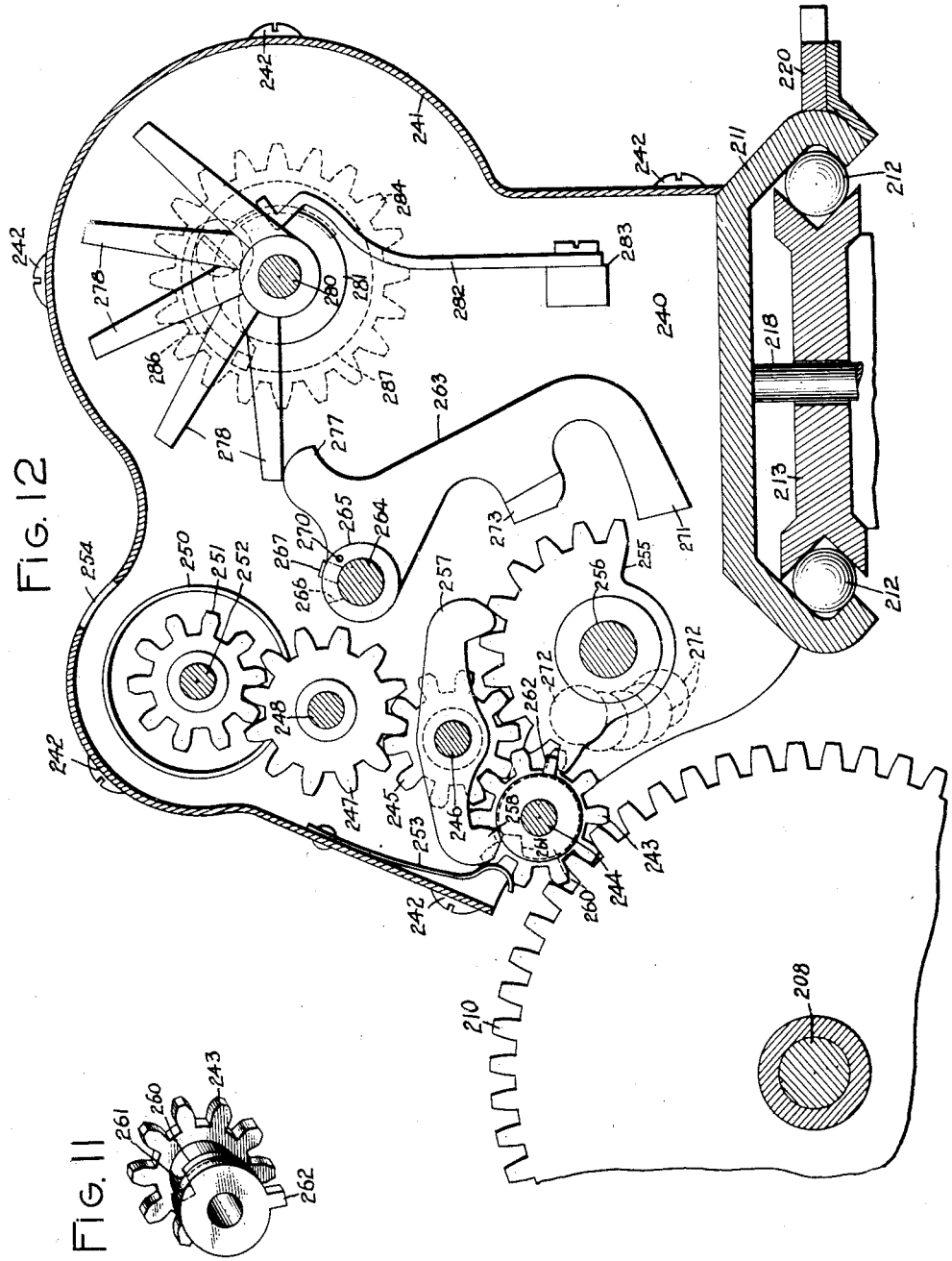

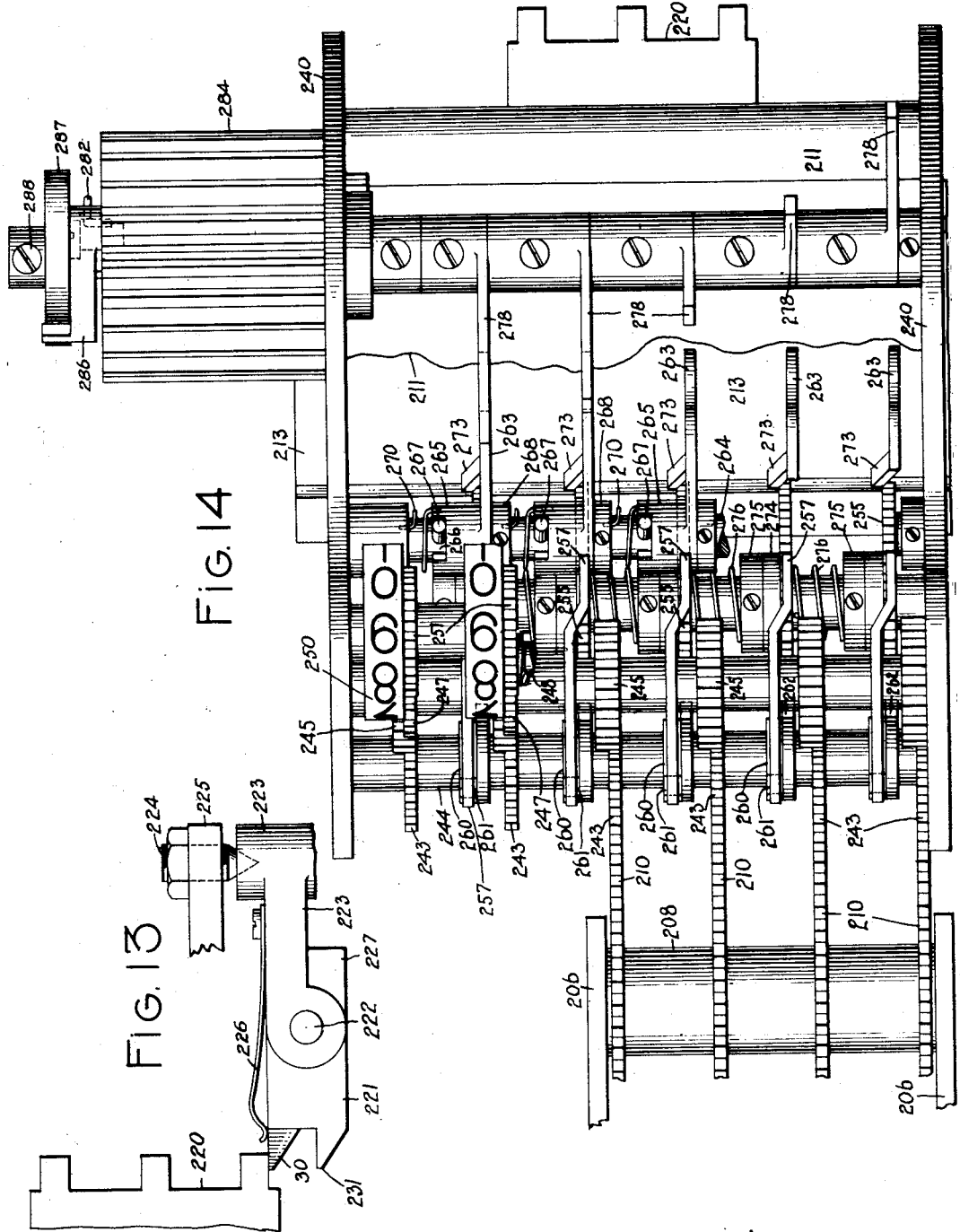

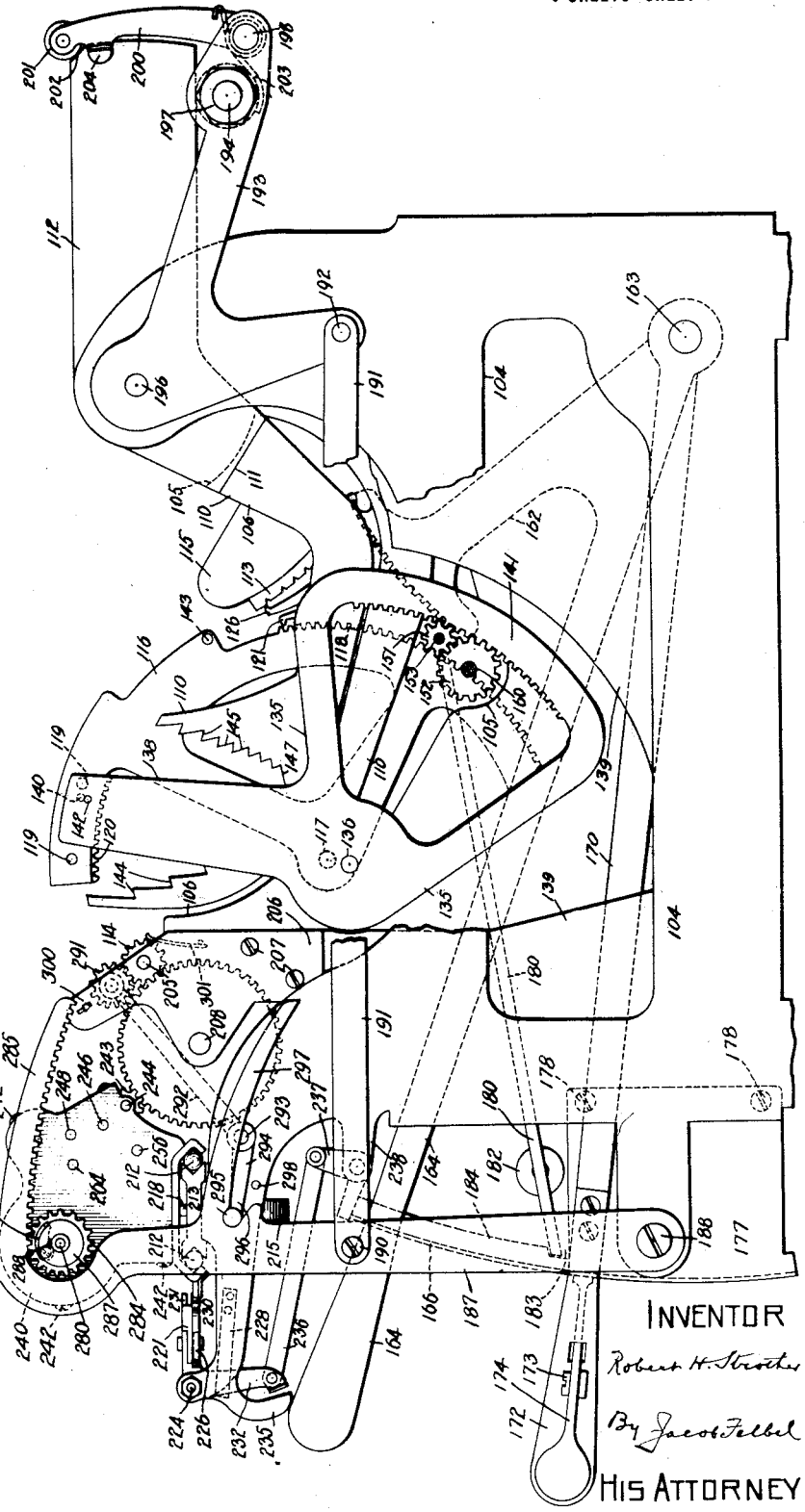

UNITED STATES PATENT OFFICE.

ROBERT H. STROTHER, OF MONTCLAIR, NEW JERSEY, ASSIGNOR TO REMINGTON TYPEWRITER COMPANY, OF ILION, NEW YORK, A CORPORATION OF NEW YORK.

COMPUTING-MACHINE.

1,214,608.

Specification of Letters Patent.

Patented Feb. 6, 1917.

Application filed April 14, 1916. Serial No. 91,050.

*To all whom it may concern:*

Be it known that I, ROBERT H. STROTHER, citizen of the United States, and resident of Montclair, in the county of Essex and State of New Jersey, have invented certain new and useful Improvements in Computing-Machines, of which the following is a specification.

My invention relates to computing machines and it has for its principal object to provide an improved multiplying machine; that is to say, to provide improved means for finding the product of two numbers. The means referred to includes mechanism working on principles which, as far as I am aware, are entirely new in machines of the class to which this one belongs.

My invention also contemplates certain improvements in calculating machines, which improvements are not necessarily limited in their application to machines designed for multiplication.

My invention consists in certain combinations and arrangements of devices and in certain features of construction, all of which will be fully set forth herein and particularly pointed out in the claims.

One machine having my invention embodied therein, is illustrated in the accompanying drawings, in which—

Figure 1:
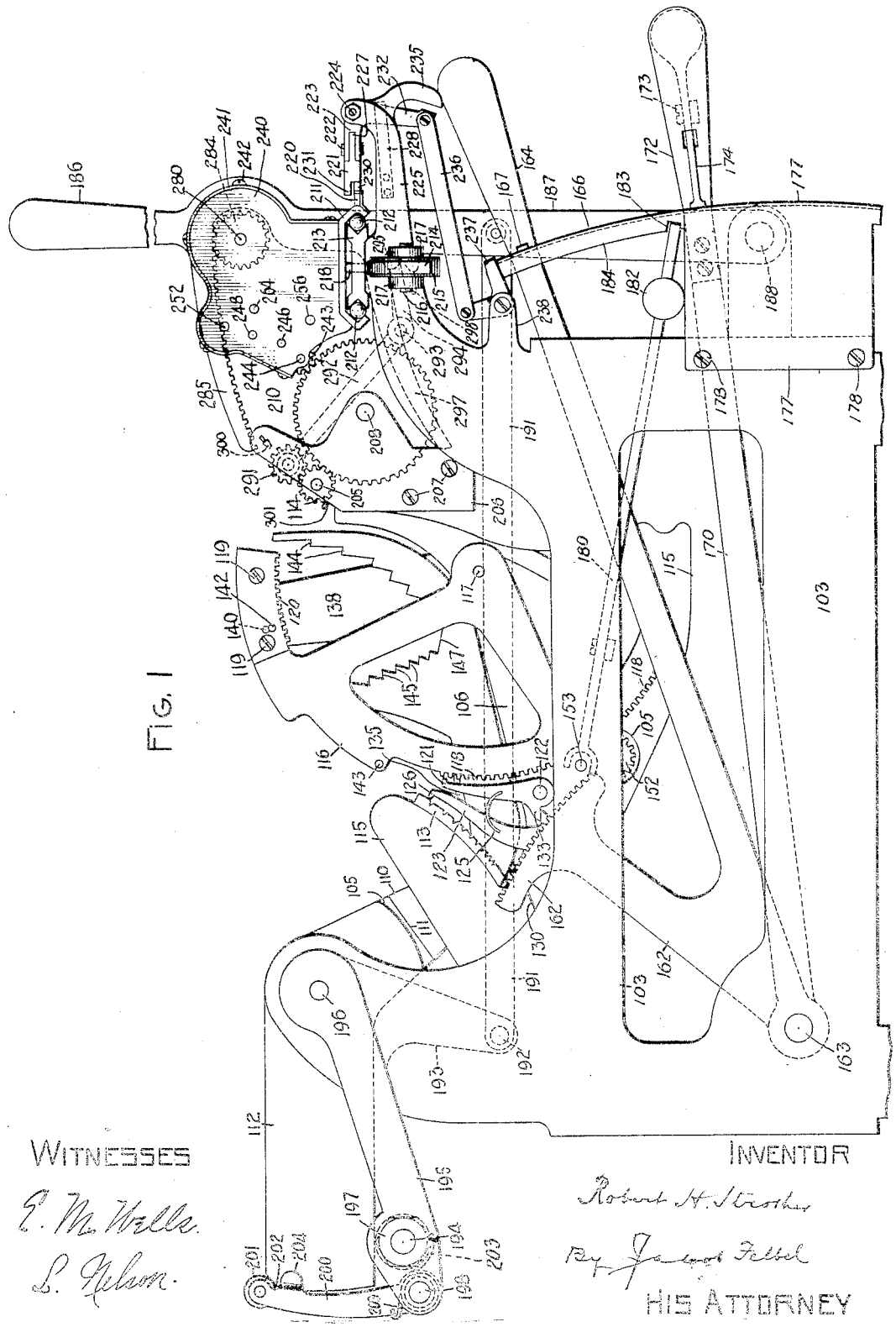
Figure 5:
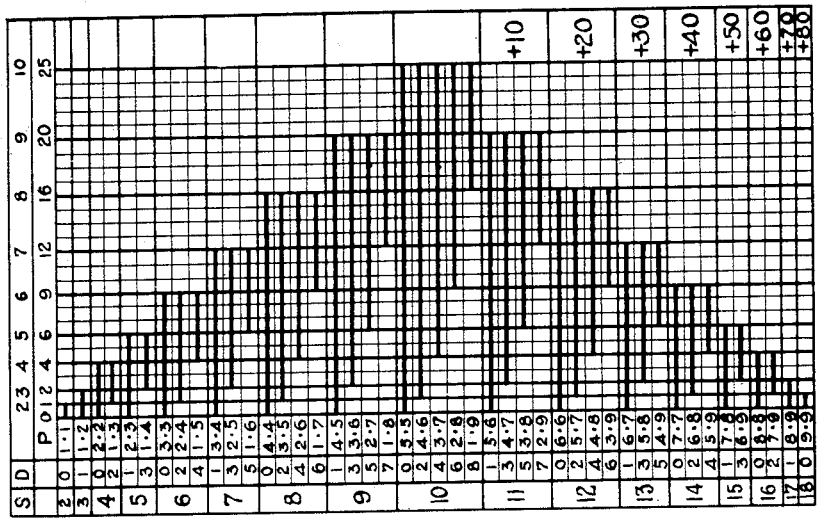
Figure 4:
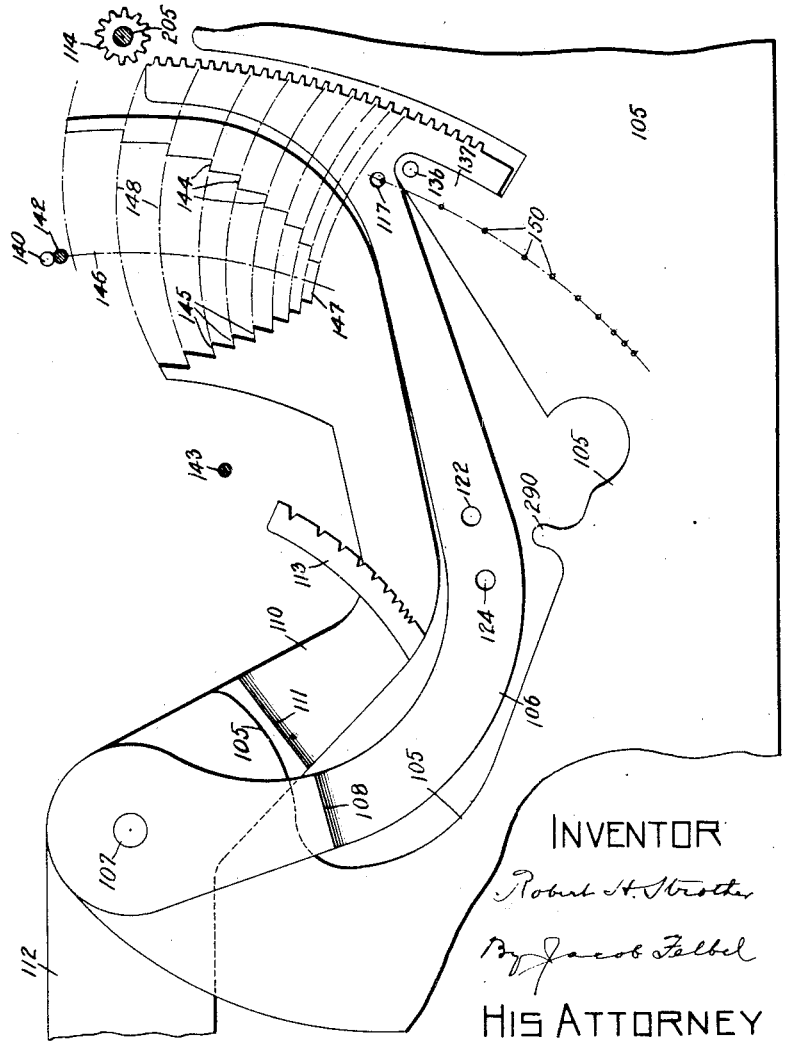

Figure 1 is a left-hand side elevation. Fig. 2 is a left-hand side elevation of one of the denominational sections comprised in said machine and of a few associated parts. Fig. 3 is a view of the working parts of Fig. 2, said parts being shown in the act of registering the product of 5 times 3. Fig. 4 is an elevation, with the parts in normal position, of a portion of the working mechanism of one of the denominational sections, this view being partly diagrammatic in character. Fig. 5 is a diagram or table to illustrate the arithmetical principles in accordance with which the machine is constructed. Fig. 6 is a front elevation of the machine. Fig. 7 is an enlarged top plan view, partly in section, of a certain change gear which in this view is shown in normal position, that is to say, in the position it occupies for the purpose of setting up a multiplicand. Fig. 8 is a similar view but showing the gear shifted over to set up the multiplier. Fig. 9 is an enlarged top plan view, diagrammatic in character, of the transmitting pinions and the racks for coöperation therewith. Fig. 10 is a top plan view of the machine with parts sectioned or broken away and some parts represented only diagrammatically. Fig. 11 is an enlarged isometric view of a certain pinion included in the register. Fig. 12 is an enlarged view in vertical fore and aft section through the register. Fig. 13 is an enlarged plan view of the carriage escapement. Fig. 14 is an enlarged plan view of the register, the carriage and associated devices, with the cover plate removed and with some other parts removed for the sake of clearness of illustration. Fig. 15 is a right-hand side elevation of the machine, with some parts broken away.

The principles of the construction and operation of the machine, grow out of the mathematical principle that the product of two factors is a function of the sum and the difference of those factors, and on another mathematical principle which will be explained hereinafter.

For the purposes of this case, the mathematical principles involved are capable of expression in various ways, one of which will be understood by reference to Fig. 5 of the drawing. In said Fig. 5, the first vertical column, headed with the letter "S," contains the sums of two factors up to and including "18", 9 times 9 being the largest product with which it is necessary to deal in multiplying numbers expressed in the decimal system. The second vertical column, headed with the letter "D," contains the differences of said factors. The third vertical column contains the pairs of factors whose product is to be obtained.

In the central part of the diagram the integers from zero to 25 inclusive are represented by vertical lines and it will be noted that certain of these lines have been made heavier than the rest and the numerical values of these heavy lines are indicated at the upper ends thereof in a series of numbers "0", "1", "2", "4", "6", "9", "12", "16", "20" and "25". The numbers just given, namely, "1", "2", "4", etc., I shall hereinafter refer to as the "significant" or "principal products". These numbers may be described as being the series of squares and of numbers obtained by multiplying together two consecutive whole numbers. In other words, this series of "principal products" may be said to consist of the products of 0 times 0; 0 times 1; 1 times 1; 1 times 2; 2 times 2; 2 times 3; 3 times 3; 3 times 4; 4 times 4; 4 times 5; and 5 times 5. This series can be continued indefinitely but the part of it given is the only part used in the present machine. The products of any two whole numbers from 0 times 0 to 9 times 9 inclusive, can be readily expressed in terms of these ten principal products. The top line of numbers in the diagram of Fig. 5, namely the numbers 2, 3, 4, 5, 6, 7, 8, 9 and 10, represent sums or differences of two factors. Each of these numbers is equal to the sum of the two factors above used to obtain the "principal product" just beneath it in the second line. For example, the number "7" in the first line is the sum of 3 and 4 whose product, "12", occurs just beneath this number "7". I shall hereinafter find it convenient to refer to the number 12 as the principal product corresponding to a sum or difference of 7, the number 16 as the principal product corresponding to a sum or difference of 8, and so on.

If, for example, the factors are 2 and 7 then their sum is 9 and their difference is 5 and their product is equal to the principal product corresponding to 9 minus the principal product corresponding to 5; that is to say it is equal to 20 minus 6, or 14. In general, the product of any two factors is equal to the principal product corresponding to the sum of the factors minus the principal product corresponding to the difference between said factors. This law is true generally but it is shown in detail in Fig. 5 only for products of factors whose sum is 10 or less. In the diagram the products of the several pairs of factors are indicated by heavy horizontal lines. It will be noted that all of these begin and end in the heavy vertical lines representing the so-called principal products.

A multiplying machine can be built based on the law above given, but in such a machine capable of handling the products of digits up to and including 9 times 9, the principal products would include numbers up to 81 and the larger of these numbers would be inconvenient to handle mechanically. In the present machine 25 is the largest principal product handled and this is made possible by a second arithmetical law or principle which will be perceived by a study of the lower part of Fig. 5.

It will be seen that the diagram of horizontal and vertical lines in the lower part of Fig. 5 is merely a reversal of that of the upper part of said figure, but that an additional column of figures has been added at the right of the diagram, "+10", "+20", "+30", etc. By a little study of this diagram it will be perceived that the products of factors whose sum is 11 is the same as the corresponding products where the sum is 9 except that in the former case 10 is to be added; that the products of factors whose sum is 12 exceed by 20 the products of the corresponding factors whose sum is 8; that those products where the sum of the factors is 13 exceed by 30 those products where the sum of the factors is 7; that products where the sum is 14 can be obtained from the products where the sum is 6 by adding 40; that the products where the sum is 15 exceed by 50 the products where the sum is 5; those where the sum is 16 exceed by 60 those where the sum is 4; those where the sum is 17 exceed by 70 those where the sum is 3; and those where the sum is 18 exceed by 80 those where the sum is 2. In short, the products where the sum exceeds 10 can be obtained from the products where the sum is less than 10 by adding on the tens wheel of the register an amount equal to the excess of the sum over 10. By "corresponding products" in this paragraph, I mean the products of factors having the same difference; or otherwise expressed, I mean the products of the complements of the original factors. If the original factors are 9 and 6, their sum is 15 and their complements are 1 and 4, and their product is 10 times 5 plus 1 times 4.

It may possibly be that a more strictly mathematical expression of these principles would be preferable, at least to some persons. The first of these principles may be thus expressed:—the product of any two factors is equal to one-quarter of the square of the sum of the factors minus one-quarter of the square of the difference of the factors; or, written algebraically, $$ab = \frac{(a+b)^2}{4} - \frac{(a-b)^2}{4}$$

It will be noted that the squares of all even numbers are exactly divisible by 4 and that the squares of all odd numbers are divisible by 4 with a remainder of 1. It will also be noted that where the sum of two numbers is even their difference is also even, and that where the sum of two numbers is odd their difference is also odd. It thus happens that in the application of this formula one fourth of the square of the sum of the two factors and one fourth of the square of the difference of the two factors are both whole numbers in every case where said sum and difference are even, and each is a whole number plus the fraction "¼" in every instance where said sum and difference are odd. In either event the resulting remainder is a whole number. Thus 2 times 5 is ¼ of the square of 7 minus ¼ of the square of 3. That is to say, it is 12¼ minus 2¼. It will be seen that the series of principal products is really two series and in an examination of Fig. 5 this fact will be apparent. Thus those heavy horizontal lines which represent products and which begin with perfect squares, 1, 4, 9, etc., all end at perfect squares, and vice versa. In view of what has been said it will be perceived that, taking the algebraic expression of the principle, the fractions ¼ can all be neglected because in every instance where these fractions occur they occur both in the subtrahend and also in the minuend, and they disappear in the remainder, one of said fractions canceling the other. With this amendment, namely, by omitting the fraction ¼, the table given by the mathematical formula becomes identical with the empirical table given in Fig. 5.

It will be perceived that in thus ignoring the fraction "¼" the entire table where the sums and differences are odd, has been off-set, as it were, by ¼ with relation to the table where the sums and differences are even. It will also be readily perceived that either or both of these tables can be thus off-set without making any difference in the result. This is for the reason that the final result consists in the difference between two terms of the series, and the same number can be added to all the terms of the series without changing these differences. When, therefore, in the claims I speak of "principal products" I do not mean to be limited to the numbers actually given in this theoretical discussion, but any series of numbers, the terms of which differ in accordance with the law above outlined, would answer the purpose as well and would be included within my definition of the term "principal products."

The second principle may be worked out mathematically, as follows:—

Let $c$ = the amount by which the sum of the factors exceeds 10.

Then
$$a+b = 10+c$$
and
$$\frac{(a+b)^2}{4} = \frac{(10+c)^2}{4} = \frac{(10-c)^2}{4} + 10c$$

Substituting in the formula
$$ab = \frac{(a+b)^2}{4} - \frac{(a-b)^2}{4},$$
we have, where $a+b$ exceeds 10,
$$ab = \frac{(10-c)^2}{4} - \frac{(a-b)^2}{4} + 10c$$

It is obvious from its form that the expression
$$\frac{(10-c)^2}{4} - \frac{(a-b)^2}{4}$$
is the product of two factors, said factors being
$$\frac{10-c}{2} + \frac{a-b}{2}, \text{ and } \frac{10-c}{2} - \frac{a-b}{2}$$

On adding these two factors together their sum is seen to be
$$10-c$$
and on subtracting the second from the first, their difference is seen to be
$$a-b$$

It will thus be seen that where the sum of the factors exceeds 10 by $c$ then the product is equal to the corresponding product of two factors whose sum is less by $c$ than 10, plus $10c$, which is another way of saying what has been said above and what is indicated in Fig. 5.

That the two factors last mentioned are the complements, respectively, of $a$ and $b$, will be made apparent by substituting for $c$ in said factors as above written, the expression
$$a+b-10.$$

If this substitution be made, said factors reduce to
$$10-a \text{ and } 10-b$$
respectively.

It may be worth while to remark that this principle, in its broadest statement, is not confined to the number 10, but is true of other numbers also. I have here used the number 10 because that number is the base of the decimal system of notation. To multiply dozens, gross, etc., the number 12 could be used instead; and 100, 1,000, etc., can also be used. It should also be remarked that the principle of adding in the next higher order the amount by which the sum of the factors exceeds the base of the system of notation, is independent of any particular process employed to find the product of factors whose sum is less than said base.

The arithmetical principles above outlined are capable of mechanical expression or of embodiment in mechanism in a large variety of forms, some of which differ widely in details from other of said forms. In the present case I have selected one such form of mechanism, in order to illustrate the invention, but it will be understood that said invention is capable of embodiment in many other forms.

The invention, in the form selected for illustration, includes devices of some character which can be set in accordance with the sum and the difference of two factors, and which when so set select or predetermine the action of a register in accordance with one of the hereinbefore mentioned "principal products" selected in accordance with the sum of the digits, and with another of said "principal products" selected in accordance with the difference of the digits. These adjustable devices in the present instance consist of stops or actuating lugs, but they may in other instances consist of electrical contacts or of ports in a controlling pneumatic mechanism, or they may consist in other devices; and any suitable means can be provided for adding in the denomination of next higher order an amount equal to the excess over 10 of any of the sums of the factors. Moreover, the "sums element" or the "differences element" can be stationary and the part on which is worked out the table of principal products, can be made adjustable with relation to said stationary element.

The present machine includes a series of denominational sections, each of which contains all of the mechanism necessary for finding the product of one digit by another, and said sections are capable of coöperation. A machine can be built containing only one section and capable of multiplying together any two numbers, provided the multiplicand contains only one digit; or as many sections can be employed as desired and the machine will be capable of handling a multiplicand having a number of digits equal to the number of sections employed. This being the case I have deemed it sufficient in the present instance to show only three sections, these being shown in Fig. 10 where each of them is designated by the reference character 100. These sections are mounted at their front and rear ends in transverse frame pieces 101 and 102, which frame pieces are secured to side frames 103 and 104. In said Fig. 10 the sections appear merely as comparatively thin plates and it is deemed impracticable to illustrate any details in such a view; the sections therefore have been merely outlined and in places broken away or ignored entirely in order to show mechanism which otherwise would be hidden in this view. Each of these sections is constructed as illustrated in Figs. 2, 3 and 4. The first of said figures is a complete side view of a section whereas in Figs. 3 and 4 a certain stationary plate has been removed, wholly in Fig. 4 and nearly so in Fig. 3. This section is made in three layers or strata or, as it is sometimes expressed in mechanical descriptions, in three planes.

The middle stratum or plane includes most of the mechanism shown in Fig. 4. 105 is a stationary frame plate having an outline which will be understood by comparing Figs. 2 and 4. Part of this plate is hidden in Fig. 2 and part of it is broken away in Fig. 4. The second piece included in this stratum or plane is the curved arm and segmental rack 106 which is pivoted at 107 to the stationary plate 105. The pivotal portion of the arm 106 lies on the side of the plate 105 nearest the observer in Fig. 4 and said plate is bent or off-set at 108, as indicated by shade lines, so as to bring the main part of the arm and the rack-toothed end thereof into the same plane as the plate 105. The third element that occupies this middle plane or stratum is the actuator 110 which is off-set at 111 and has its pivoted end lying against the side of the plate 105 away from the observer in Fig. 4, and which is pivoted on the same pivot 107 as the arm 106. This actuator 110 has a rearwardly extending arm 112 by means of which the actuator is driven. The plate 110 has a toothed rack 113 secured to the proximate face thereof so that said rack lies in the plane toward the observer instead of in the middle plane. It will be noted from the diagram in Fig. 5 that the largest number that it is ever necessary to add at one time, is twenty-five and the rack 106 has therefore a number of teeth capable of adding numbers up to and including twenty-five, such adding being done through the instrumentality of a pinion 114 which stands normally a little above the end of said rack.

In the plane or stratum next the observer there is included a stationary plate 115, the principal functions of which are those of guiding certain parts and of stiffening the section. The outline of this plate is shown in full in Fig. 2. It will be seen that at the left-hand part of said figure said plate lies over the arms 106 and 110 so as to guide said arms and at the right-hand end of said figure it overlies the rack-toothed end of the part 106 and guides said end with precision. In this plane there is also included a segment 116 which is pivoted at 117 to the arm 106. At its lower left-hand part said segment is formed into a segmental rack 118 and at its upper part it has secured thereto by screws 119 another rack 120. Through certain mechanism to be presently described this segment 116 is turned toward the right in Fig. 2 a number of tooth-spaces of the rack 118 equal to the number representing the multiplicand and afterward this segment is moved in the same direction a distance appropriate to the multiplier. For example, if the product was 5 times 3 the rack 118 would be moved five teeth in setting up the multiplicand and afterward it would be moved three teeth in setting up the multiplier. This segment would therefore be moved toward the right a distance equal to eight teeth in this example, and generally stated, it is moved a distance appropriate to the sum of the two factors. I therefore sometimes call this part the "sums segment."

The rack 120 is so arranged that when the segment 116 has been moved ten teeth said rack is just coming into position where it is ready to turn a pinion 114. If the sum of the factors exceeds ten the rack 120 will turn such pinion 114 a number of teeth equal to the amount by which the sum of the factors exceeds ten. If the rack 120 turns the same pinion 114 as the rack 106 of the same section, then the register carriage will be stepped one space toward the left after the multiplier has been set up and before the rack 106 is operated, with the result that the rack 120 will add in the next higher denomination or order than the rack 106. In the present machine, however, the carriage does not step at this time and the rack 120 turns the pinion 114 of next higher order than that engaged by the rack 106.

The relation of the several pinions 114 to one another and to the several racks 106 and 120, is illustrated diagrammatically in Fig. 9 which is a plan view and in which the right-hand side of the figure is the front of the machine. The narrow pinion 114 at the top of this figure, represents units, and the rack 106 of the units section is in position to engage this pinion. The next pinion 114$^a$ represents tens and is in position to be engaged by the rack 120 of the units section. The next pinion 114 is also of the tens denomination, and is arranged to be engaged by the rack 106 of the tens section. The next pinion 114$^a$ is a hundreds pinion and it is in position to be engaged by the rack 120 of the tens section, and it is contiguous to the pinion 114 of hundreds denomination, which is arranged to be engaged by the rack 106 of the hundreds section. The last pinion 114 is the thousands pinion and that is in position to be engaged by the rack 120 of the hundreds section. It will be perceived that the machine contains pinions for one more denomination than there are sections 100. In all of said denominations except the highest and the lowest, the racks 120 engage separate pinions 114$^a$, and means are provided whereby, during the time when the multiplier is being set up, each pinion 114$^a$ is coupled to the pinion 114 of like denomination, so that said pinions turn together as one; whereas, during the time when the racks 106 are being operated, the pinions 114 are uncoupled from the pinions 114$^a$, so that the former can turn independently of the latter. This is because it may sometimes happen that, when a pinion 114 should be turned by its rack 106, the pinion 114$^a$ of like denomination might be engaged by its rack 120. This contingency can be provided for in various other ways than the one shown in the present case. The said coupling and uncoupling means will be described hereinafter. These pinions 114 and 114$^a$ are shown in the plan view, Fig. 10, but the coöperating mechanism is not so fully represented in this view.

The plane nearest the observer in Fig. 2 also includes a pawl 121 pivoted at 122 to the arm 106 and having its free end in position to engage between two of the teeth of the rack 118 as shown in Fig. 3 but normally out of engagement as shown in Fig. 2. There is also included in this plane a dog or lever 123 pivoted to the arm 106 at 124 and connected with the pawl 121 by a contractile spring 125 which spring normally holds the two pawls in the position shown in Fig. 2. The dog 123 has a tooth 126 adapted for coöperation with the notches in the rack 113 which notches are spaced apart in accordance with the "principal products" hereinbefore referred to. The lowermost notch in the rack corresponds to zero; the next notch to "1"; the next to "2"; "4"; "6"; "9"; etc. as has been explained, the numbers in this instance referring to teeth of the rack 106; that is to say, the angular distance from the lowermost notch in the rack 113 to the one next above it, is equal to the angular distance between two teeth of the rack 106.

The dog 123 has an arm extending nearly in the opposite direction from that which carries the tooth 126 and said arm ends in a tooth 127 which normally rests in a notch 128 in the stationary plate 115.

Immediately succeeding this notch 128 said plate is formed with an edge 130 which edge is in the arc of a circle concentric with the pivot 107. The tooth 126 normally rests on an edge 131 of the rack 113. The main part of this rack is concentric with the pivot 107 but this edge 131 projects slightly farther from the center so that when the parts are in the normal position shown in Fig. 2 said edge acting on the tooth 126 holds the tooth 127 forcibly or positively in the notch 128. By this means the arm 106 is normally held locked in the position shown in Fig. 2 but the construction is such that if the actuator 110 be first moved to such a position that one of the notches of the rack 113 is in register with the tooth 126, then upon the exertion of any force tending to have that effect, the arm 106 can move upward. As soon as said arm does move upward the tooth 127 moving out of the notch 128 on to the concentric surface 130, will force the tooth 126 into the said registering notch of the rack 113 and said tooth will continue positively engaged with said notch as shown in Fig. 3 until in the return stroke of the parts the tooth 127 again enters the notch 128 when the tooth 126 will be withdrawn from the notch in the rack 113. It will be perceived, therefore, that when the parts are in some such position as is illustrated in Fig. 3 the dog 123 positively locks the arm 106 and the actuator 110 together so that for the time being these two parts are incapable of relative motion, but both can turn together about the pivot 107.

The dog 123 has an arm 132 which engages an arm 133 on the dog 121 in such wise that when the dog 123 is forced to the locking position shown in Fig. 3 the dog 121 is by said arms 132 and 133 forced into engagement with the rack 118, thereby locking said rack in the position to which it has been set by the setting up of the multiplicand and the multiplier.

In the plane or stratum away from the observer in Fig. 2 the principal working part is the "differences segment" 135 which is pivoted at 136, Figs. 3 and 4, to a tongue 137 of the main stationary plate 105. This segment includes an arm 138 having projecting therefrom toward the observer in Fig. 3 a pin 140 which pin constitutes the differences stop for arresting the actuator 110 as shown in Fig. 3. The segment 135 includes an internally toothed rack 141 which, as shown in Fig. 2, is not very far removed from the rack 118 of the sums segment 116 but the two racks are in different planes or strata separated from each other by the middle stratum of the section. In this stratum there are, or may be, also included stationary guiding and stiffening plates 139 (Fig. 15).

The differences segment 135 is moved in one direction to set up the multiplicand and in the opposite direction to set up the multiplier. The final position of said segment will therefore accord with the difference between the multiplicand and the multiplier. As shown in the present instance the said segment is so operated as to move the pin 140 toward the left in Fig. 3 in order to set up the multiplicand and toward the right in order to set up the multiplier. It will be perceived that the final position of this pin will be at the right-hand side of its normal position if the multiplier exceeds the multiplicand and will be at the left-hand side thereof if the multiplicand exceeds the multiplier. It will also be perceived that the two segments are moved in the same direction to set up one of the factors and in the opposite direction to set up the other factor. In the present instance the two segments are moved in opposite directions to set up the multiplicand and are then moved in the same direction to set up the multiplier. In Fig. 3, in which the machine is shown in the act of finding the product of a multiplicand equal to 5 by a multiplier equal to 3, the segment 116 has been moved eight spaces toward the right and the segment 135 stands two spaces to the left of its normal position. In the case of the segment 116 these "spaces" are tooth-spaces of the rack 118 and in the case of the segment 135 they are tooth-spaces of the rack 141.

The sums segment carries two pins or lugs 142 and 143, each of which projects into the plane of the actuator 110. These two pins are at the same distance from the pivot 117 of said segment and they are spaced apart angularly a distance equal or corresponding to twenty teeth of the rack 118.

The actuator 110 has a form that will be best understood from Fig. 4 where it will be seen that at or near its free end it is formed with two series of teeth or steps 144 and 145. In the present instance said actuator is formed with two fingers constituting a sort of fork and the teeth or steps 144 are on the inner edge of the right-hand limb of said fork and the teeth or steps 145 are on the inner edge of the left-hand limb of said fork. A comparatively slight change in the design of the mechanism would result in the actuator, or the corresponding part of another machine made in accordance with this general invention, having the general form of a triangle with the teeth 144 on the left-hand slope of said triangle and the teeth 145 on the right-hand slope thereof. In that case the part corresponding with the segment 116, in other words, the sums segment, would have only one stop pin and the differences segment would have two stop pins. In some other embodiment of the invention these teeth would be replaced with devices of some other form. In each instance, however, these devices represent the series of "principal products" hereinbefore referred to, and the part having the series of principal products worked out on it, I sometimes call the "table of principal products". In the present instance, the actuator 110 constitutes the "table of principal products". In Fig. 4 the parts are indicated in normal position and it will be observed that the stops 140 and 142 are near together and situated about on the same arc 146 concentric with the pivot 107. This arc, when prolonged downward, passes through the center of the lowermost step 147 which joins the two series of steps or teeth 144 and 145. It will be noted that this lowermost step 147 is of a width in a right and left-hand direction about equal to three times the width of any one of the steps 144 and 145. The construction is such that if the actuator 110 be moved upward without any preliminary setting of the parts, then the middle part of the step 147 would strike the pin 142 and press said pin upward against the stop 140. It will be recalled that the pin 142 is mounted on the segment 116 which in turn is mounted on the segment or arm 106, while the pin 140 is mounted on the segment 135 which is pivoted at 136 to a fixed part of the machine. Consequently if the actuator 110 be operated without any preliminary setting of the segments the rack 106 will not be moved.

If now the two segments be operated one space the pin 142 will be moved one space to the right from its normal position shown in Fig. 4 and the pin 140 will be moved one space to the left from such position. This is the operation of setting up a multiplicand equal to "1." If now the actuator 110 be operated without setting up any multiplier the pin 142 will be struck by the step 147 near the right hand end of said step and will be lifted carrying with it the rack 106 until the actuator 110 is arrested by the pin 140 intercepting the left-hand end of said lowermost step 147. This operation will raise the rack 106 just enough to take up the lost motion between the rack 106 and the pinion 114 but not enough to turn said pinion. A similar thing will happen if any other multiplicand be set up without setting up any multiplier. Thus if a multiplicand of "5" be set up the pin 142 will be moved five spaces to the right and the pin 140 will be moved five spaces to the left. If now the actuator 110 be operated the pin 142 will be caught up by the fourth step 144 from the bottom and will be moved until the actuator is arrested by the pin 140 intercepting the fourth one of the steps 145. This will again move the rack 106 only to the extent required to take up the lost motion between the said rack and the pinion 114 but will not turn said pinion. If, however, after setting up the multiplicand of "5" in the manner just indicated a multiplier be set up, then the pinion 114 will be turned by the operation of the actuator 110. If, for example, the multiplier be "3" then both segments will be moved three spaces toward the right, bringing the pin 142 to the eighth space to the right of its normal position and bringing the pin 140 back from the fifth space to the left of its normal position to the second space to the left of said normal position. When the actuator 110 is now operated, the pin 142 will be caught by the seventh tooth or step 144 and will be moved until the actuator 110 shall have been arrested by the first one of the teeth 145 as shown in Fig. 3. Said seventh tooth 144, corresponding to a sum of 8, has an elevation corresponding to sixteen teeth of the rack 106; and the first step 145, corresponding to a difference of 2, has an elevation of one tooth of said rack. The tooth 144 has a capacity for moving the rack 106 a distance of sixteen teeth but the actuator 110 is arrested one tooth in advance of the extreme excursion of said actuator so that the actual motion of the rack 106 is fifteen teeth. In case a multiplier is set up in any section without a multiplicand having been previously set up, the pins 140 and 142 will both be moved the same distance toward the right, and the one will stand directly over the other, so that, when the actuator 110 is operated nothing will be registered.

The layout of the toothed end of the actuator in Fig. 4 will be understood from the broken lines 148. These are arcs drawn from a series of centers 150 which centers are spaced apart distances corresponding to the "principal products" when said products are expressed in terms of teeth of the rack 106. These arcs have been prolonged so as to reach through said teeth in order to make this relationship clearer. It will be noted that the uppermost one of the centers 150 is shown on the drawing as being slightly below the center of the pivot 117. The distance between these two centers represents the lost motion between the actuator 110 and the pin 142. The uppermost one of the arcs 148 has been prolonged toward the left in order to show the amount of this lost motion. It will be seen that said arc passes about the same distance below the pin 142 as the center of said arc is below the center of the pivot 117. It will also be noted that in the normal position of the parts the pivot 117 is not quite on a straight line between the pivot 136 and the pins 140 and 142. This pivot would, however, be nearly on such line by the time the rack 106 had moved far enough to take up the lost motion between it and the pinion 114.

In the instances so far given of the use of this mechanism, the sum of the factors has been less than 10. When the sum of the factors is equal to 10 the pin 142 will stand above the topmost one of the steps 144. In case the factors were 5 and 5 the pin 140 would have moved first five spaces toward the left and then five spaces toward the right so that this pin would have returned to its normal position shown in Fig. 4. If then the actuator 110 be operated said actuator would have freedom to move through its entire excursion and as the pin 142 would be lifted by the highest step 144 the wheel 114 would be turned twenty-five spaces. If on the other hand, the factors were 4 and 6 then the pin 142 would be in the same position but the pin 140 would be two spaces to the left or two spaces to the right of its normal position, depending on whether the 6 or the 4 was first set up. When the actuator 110 was operated said actuator would be arrested one space short of its full excursion by the pin 140 intercepting the first or lowermost tooth 145 if 6 was the multiplicand or by the lowermost tooth 144 if 4 was the multiplicand. In either event the wheel 114 would be turned twenty-four spaces or teeth.

In case the sum of the digits exceeds 10 then, as has been explained, the excess over and above 10 will be registered on the next higher wheel 114 by the rack 120. In this case, moreover, the pin 142 will have passed to the right of the topmost step of the series 144 and will, therefore, have become inoperative. It is at this time that the pin 143 comes into operation, this pin standing over the highest one of the steps 145 when the sum of the factors is 11. This step has the same effective height as the next to the highest one of the steps 144 so that with the pin 143 standing over this step for a sum equal to 11 the operation of the rack 106 will be the same as if the pin 142 had stood over the next to the highest step 144, which last mentioned position corresponds to a sum equal to 9. It will thus be seen that the operation of the rack 106 is the same when the sum of the digits is equal to 11 as when the sum of the digits is equal to 9. When the sum of the digits is equal to 12 the pin 143 on the segment 116 will stand over the next to the highest step 145 where it will have the same effect on the rack 106 as if the pin 142 had stood over the second from the highest step 144. It will thus be seen that the action of the rack 106 is the same when the sum of the factors is equal to 12 as it is when the sum of the factors is equal to 8. It will also be perceived that this relation holds in succession all up to and including a sum of 18. That is to say, a sum of 13 corresponds with a sum of 7, 14 to 6, 15 to 5, 16 to 4, 17 to 3, and 18 to 2. It happens that the same thing is also true of 19 so that the machine would give the product of 9 and 10 and also of 20 so that the machine would give the product of 10 times 10. This last would be done by adding 10 on the next wheel 114 of higher order. The pin 140 would have returned to normal position and the pin 143 would stand directly under it so that the rack 106 would not give any operation. These last two instances, however, are not used in practice as the largest product that one of these sections is ever called upon to handle is that of 9 by 9.

It will, of course, be understood that the adjustments necessary to set up the multiplicand and the multiplier, are relative adjustments. In the present instance, the "table of principal products" remains stationary during the making of these adjustments, while the sums and differences elements are the parts adjusted; but in other forms of the invention, this can be varied. Also, it is not essential that the sums and differences elements coöperate with the same identical steps 144 and 145, as in the present instance.

It will be perceived that the part of the mechanism already described is capable, if geared up to any suitable indicating or registering mechanism, of giving the products of any two digits. It will be seen that the toothed or stepped actuator 110 and the rack 120 together contain within themselves the entire multiplication table from 0 times 0 to 9 times 9, inclusive. Thus if a multiplicand of 5 be set up, that is to say, if the pin 140 be moved five spaces to the left and the pin 142 five spaces to the right, then the mechanism is set for the 5 multiplication table. If now these two pins be moved one space toward the right and the actuator operated, the product 5 will be obtained. If the pins be moved two spaces toward the right the product 10 will be obtained. If the pins be moved three spaces toward the right the product 15 will be obtained, and so on. If, instead of moving the pins five spaces in opposite directions from normal position they had been moved six spaces, then if the two pins are moved together one space an operation of the machine will give the product 6; if two spaces, 12; if three spaces 18, and so on. In short, if the two pins be moved in opposite directions one space the machine is then set for the 1 table. If they be moved in opposite directions two spaces the machine is then set for the 2 table, and so on. Thus all nine of the multiplication tables are included in this stepped actuator, together with the rack 120, by making suitable settings of the pins 140, 142 and 143.

It may possibly be worth mentioning that in some few instances the same product is obtained with this machine in more than one way. Thus the product of 6 and 2 is obtained as the difference between 16 and 4, whereas the product of 3 and 4 is obtained as the difference between 12 and 0; the product being 12 in both cases. 24 is obtained in two ways, more widely different. If the factors are 4 and 6 the product comes out, as above explained in detail, as the difference between 25 and 1. If, on the other hand, the factors are 3 and 8 then, the sum of the factors being 11, the rack 120 turns the tens wheel one tooth, the pin 143 is lifted by the highest one of the teeth 145 which is capable of adding 20 but the actuator is arrested by the fourth tooth 144 or 145 from the bottom, so that the operation of the rack 106 is in amount equal to the difference between 20 and 6 or 14. In other words, 10 is added by the rack 120 and 14 by the rack 106. In the cases of the larger products the operation is more largely by the rack 120. Thus in 8 times 9, said rack 120 adds 7 on the tens wheel and the rack 106 adds 2 on the units wheel; and in the product of 9 by 9 the rack 120 adds 8 on the tens wheel and the rack 106 adds 1 on the units wheel.

The reader will no doubt already have perceived that the principle of the mechanism thus far described is capable of embodiment in a great variety of forms of which that shown in the drawing is only an illustrative instance.

It will also readily be perceived that the mechanism for coöperating with the parts thus far described can be of any one of a great variety of sorts. In the present instance the means for moving the pin 140 back and forth acts through the rack 141 and the means for moving the pins 142 and 143 acts through the rack 118, and said means comprises a change gear mechanism including a pinion 151 and a gear 152 in mesh therewith. When the parts are in normal position the pinion 151 extends through the denominational section and meshes with both of the racks 118 and 141. When, therefore, this pinion is turned to set up the multiplicand, it moves the sums segment 116 in one direction and the differences segment 135 in the opposite direction. When the parts are in this position the gear 152 is not in mesh with either of the racks, the position of the pinions with relation to the racks being that indicated in Fig. 7 which is an enlarged plan view in horizontal section of this part of the mechanism. The gearing can be shifted toward the left, that is to say, toward the bottom of the page in Fig. 7, to the position shown in Fig. 8 where the pinion 151, while remaining in mesh with the rack 118, is moved out of mesh with the rack 141 and the gear 152, continuing in mesh with the pinion 151, is moved into mesh with the rack 141. If now said pinion be turned the racks 118 and 141 will be moved in the same direction instead of in opposite directions. This is the position to which the parts are shifted for the purpose of setting up the multiplier. The mounting of this change gear mechanism is perhaps best shown in Fig. 10 where the upper portions of the sections 100 have been broken away or ignored in order to show this mechanism, most of which it will be understood, would be hidden in a regular plan view in which all of the parts were shown. A shaft 153 is mounted at its ends in the side plates 103 and 104 with freedom to slide endwise a distance limited by two collars 154 and 155 mounted on said shaft and adapted to be arrested respectively by the side plates or frame pieces 103 and 104. One of these collars, as for example the collar 155, is prolonged to form an arm 156 from which a pin 157 projects through a hole in the frame piece 104, the construction being such as to prevent any turning motion of the shaft or rod 153 notwithstanding said shaft is free to slide endwise. In the present instance in which three sections 100 are shown, this shaft has secured thereon three arms 158 each of which has one of the gears 152 journaled thereon on a pivot screw 160, Fig. 3. Each of these arms 158 surrounds the shaft 153 to which it is secured as by a pin 161 (Fig. 7). The pinions 151 are mounted on the shaft 153 and located between the hubs of the arms 158 or are prevented in any other suitable way from endwise motion relative to said shaft. The construction is such that when the shaft is in its normal position shown in Fig. 10 all of the gears 152 are out of mesh with the racks 141 and all of the pinions 151 are in mesh both with said racks 141 and also with the racks 118; and when the shaft 153 is moved to position for setting up a multiplier then the pinions 151 are all out of mesh with the racks 141 and the pinions 152 are all in mesh with said racks.

The pinions 151 and gears 152 can be turned for the purpose of setting up the multiplicand and the multiplier by any suitable means. In the present instance I have preferred to show extremely simple mechanism for this purpose, which mechanism can in practice not only be varied but also it can be elaborated to make it more convenient in use. As here shown, I have provided three segmental racks 162, Figs. 1 and 10, each of said racks meshing with one of the pinions 151 and all of said racks pivoted on a cross rod 163 mounted at its ends in the frame pieces 103 and 104. These racks can be actuated in any suitable way but as here shown each of them has a long handle or lever arm 164 projecting therefrom toward the front of the machine, Figs. 1, 6 and 10, and near their forward ends each of said arms passes through a vertical slot 165 in a plate 166 and each of said arms has a tooth 167 for engagement in a series of notches 168 formed at one side of each of the slots 165. The construction is such that if any one of these arms be moved downward in its slot it will spring to the left in Fig. 6 causing the tooth 167 (Fig. 1) to become positively engaged in one of the notches 168, each of these notches corresponding to one of the digits from "0" to "9", inclusive. It is in this way that the multiplicand is set up. Thus if the multiplicand is "895" the left hand arm 164 will be moved downward eight spaces, the middle one nine spaces and the right-hand one five spaces, thus setting up "8" as the multiplicand in the left-hand section 100; "9" in the middle section; and "5" in the right-hand or units section.

The plate 166 is mounted on two long arms 170 which at their rear ends are rigidly mounted on the rod 163, the arms or segments 162 being spaced apart on said rod by collars 171. The construction is such that after the multiplicand has been set up all of the arms 164 can be moved down together by moving downward the plate 166 and its supporting arms 170, rocking the rod or shaft 163. To this end one of the arms 170 is prolonged into a handle 172 and on said handle at 173 there is pivoted a latch 174 which is held by a compression spring 175 into engagement with a series of ten notches 176 formed in the edge of a scale plate 177 secured by screws 178, Fig. 1, to the frame piece 103.

In order to shift the rod 153 before operating the handle 172 to set up the multiplier, the collar 154 is formed with a groove into which fits the forked end of a lever 180, which lever is pivoted on a vertical pivot 181, (Fig. 10) to the side frame piece 103, said lever extending forward to the front of the machine where it is provided with a push button or key 182. The forward end of this lever 180 normally stands in a notch 183 formed in a flange 184 of the plate 166. The lever 180 is held in its normal position, that is to say, in its position for setting up a multiplicand, by means of a spring 185, Fig. 10, compressed between said lever and the frame piece 103. The construction is such that when the lever is in its said normal position the plate 166 is locked against depression by means of the forward end of said lever engaging in the notch 183. The construction is such that it is necessary to operate the key 182 to shift the change gearing to set the machine for a multiplier before it is possible to move downward the handle 172; and when said handle is out of its normal position, then the lever 180 is locked in its operated position by the flange 184 so that the gearing cannot be changed back to position for setting up a multiplicand until after the lever 172 shall have been restored to normal position.

In order to set up a multiplier, therefore, after the handles 164 have been set in accordance with the multiplicand, the key 182 is pushed toward the right, the latch 174 is released, and the handle 172 is moved downward a distance across the scale 177 appropriate to the desired multiplier. Thus if the multiplier is 3 then the handle 172 will be moved downward until the latch 174 engages the notch 176 marked "3" after which all of the actuators 110 are operated by means presently to be described.

It will be understood that when the handle 172 is moved downward it carries all of the handles 164 with it and turns all of the pinions 151 a number of teeth corresponding with the desired multiplier. At this time said pinions 151 are in mesh with the racks 118 and the pinions 152 are in mesh with the racks 141 so that both of said racks are moved in accordance with the multiplier and in a direction to move all of the pins 140, 142 and 143 toward the right a number of spaces corresponding with said multiplier. In the case above supposed where the multiplicand was 895, the hundreds section will have been set for the 8 table, the tens section will have been set for the 9 table, and the units section will have been set for the 5 table, so that, when each of these sections is further set for a multiplier of 3, then in the hundreds section 8 will be multiplied by 3, in the tens section 9 will be multiplied by 3 and in the units section 5 will be multiplied by 3. In the hundreds section the segment 116 will be moved toward the right eleven spaces in all, so that its rack 120 will turn the thousands wheel 114 one tooth. In the tens section the corresponding segment will be moved twelve spaces so that its rack 120 will be moved into engagement with the hundreds wheel 114ª and will turn said wheel two teeth. In this instance the hundreds wheel 114 will be turned two teeth by the tens rack 120 and said hundreds wheel 114 will be turned fourteen teeth by the hundreds rack 106. These pinions 114, as will be described hereinafter, are geared to a register and it will of course be understood that in said register the various wheels will, on occasion, be still further turned by transfer.

The actuators 110 can be operated by any suitable means. As here shown, an operating handle 186 consists of the upper end of a lever 187 which at its lower end is pivoted at 188 to an extension of the frame piece 104. Between its ends this lever has pivoted thereto at 190 the forward end of a link 191 which at its rear end is pivoted at 192 to the depending arm of a bell-crank 193, which bell-crank also has a rearwardly directed arm, this last being connected by means of a cross bolt 194 with another arm 195, said arm 195, bolt 194 and bell-crank 193 together constituting a bail or yoke-shaped frame projecting rearward from the main frame of the machine. Said arm and said bell-crank lie respectively outside of the frame plates 103 and 104 to which they are pivoted at 196, the pivots 196 being preferably about co-axial with the pivots 107 hereinbefore described. The bolt 194 is of reduced diameter at its ends where it passes through the parts 193 and 195, thus forming shoulders against which said parts are tightly clamped by nuts 197, thus forming a rigid yoke-frame pivoted at 196. The arms 193 and 195 are prolonged toward the rear beyond the bolt 194 and said arms are connected by a cross rod 198 on which are pivoted the hubs of a series of arms 200. Said arms 200 are made double and each of them has a roller 201 journaled in the upper end thereof and normally engaging a bevel 202 at the upper rear corner of one of the arms 112. The arms 200 are pressed toward the front of the machine by any suitable springs 203. The arms 200 can also be formed with ears 204 lightly embracing the arms 112 for guiding purposes. The construction is such that if the handle 186 be pulled toward the front of the machine the yoke frame will be rocked downward, carrying the arms 200 and rollers 201 with it. As these rollers are pressed by the springs 203 against the corners 202, they will carry the arms 112 down with them; but when any actuator 110 is arrested by its stop 140 the roller 201 can yield against the pressure of its spring 203 and run off of the corner 202 after which said roller will roll down the rear edge of the arm 112 until the yoke-frame has reached the extreme limit of its downward motion. On the return stroke of the handle the yoke-frame will move upward and the rollers will roll upward along the edges of the arms 112, each until it reaches the upper corner 202. At this time the bolt 194 will have reached the under edge of the arm 112 and will carry said arm positively back to normal position.

It will be readily understood that the pinions 114 can be geared up to any suitable registering mechanism in any one of a variety of ways. In the present instance these pinions are all journaled on a stationary rod 205, Figs. 1 and 2. This rod passes through upstanding ears of the plates 115 as indicated in Fig. 9 and it is also mounted at its ends in plates 206 secured as by screws 207, one to the left-hand one of the plates 115 and the other to the left-hand guide plate 139 in the units section 100, Fig. 15.

Mounted in the same plates 206 is another rod or shaft 208 on which is journaled a series of gear wheels 210 each meshing with one of the pinions 114 as shown in Fig. 9.
As it is desirable in a multiplying machine that the register be in a step-by-step moving carriage, these gears 210 are spaced uniformly apart across the machine as shown in Figs. 9 and 14. The gears 210 are of such size as to enable the register to be set far enough toward the front of the machine so as never to interfere with the operation of the racks 120. Each of said gears can be engaged by any suitable detent as 209, Fig. 2.

The register is mounted in a carriage 211 arranged to travel in a right and left-hand direction on balls 212 running in grooved race-ways in said carriage and in a stationary rail 213, which rail is mounted on brackets extending toward the front of the machine and constituting parts of the frame plates 103 and 104.

The carriage is drawn toward the left by means of a band 214, Fig. 6, running over a spring drum 215 journaled at 216 in brackets 217 of the frame plate 103, said band being connected to a pin 218 extending downward from the carriage through a longitudinal slot in the stationary rail 213.

The carriage escapement comprises a toothed bar 220, Figs. 13 and 14, having three teeth projecting toward the front of the machine from the carriage and coöperating with a two-toothed dog 221 pivoted at 222 to a dog rocker 223 which is pivoted at 224 in brackets 225 of the frame plates 103 and 104. The dog 221 is controlled by a spring 226 which holds it in the normal position shown in Fig. 13, the motion of the dog under the impulse of said spring being limited by a tail 227 engaging the arm of the dog rocker 223. In this position the dog resists the motion of the carriage toward the left but it is adapted to yield about its pivot 222 to allow the carriage to be moved toward the right by hand. The dog rocker in operation is adapted to be swung up and down about its pivot 224 and to be yieldingly held in either of its two positions by means of a friction spring 228, Fig. 1, which presses against an arm of said dog rocker. Said dog has two teeth 230 and 231 spaced apart as seen in plan view about half the distance from one of the teeth of the rack 220 to the next, and the tooth 230 being in a lower plane, as seen in side elevation, than the tooth 231. The tooth 230 is normally in engagement, as shown in Figs. 1 and 13. If the dog 221 be moved downward so as to bring the tooth 230 out of engagement with the rack, said rack will step half a tooth space before it is arrested by the tooth 231. When the dog rocker is swung up again to normal position said tooth 231 passes out of engagement with the rack, which rack thereupon makes the other half of its step, being arrested by the next one of its teeth engaging the dog-tooth 230.

In order to operate the carriage escapement the dog rocker 223 is provided with a depending arm 232 (Figs. 1 and 6) and said arm at its lower end is formed with a horizontal branch 233 which branch lies in the path of an arm or bracket 234 extending toward the left from the operating handle 186. This handle has such an extent of motion as that any one of the actuators 110 will have completed its greatest excursion, equivalent to twenty-five tooth spaces of the rack 106, a little before said operating handle completes its forward motion. The operation of the racks 106 is therefore always finished a little before the operating handle completes its forward motion. The escapement is operated by the extreme final part of the motion of said handle and, therefore, after the racks 106 have completed their strokes. The effect of the forward stroke of the handle 186 is to depress the dog 221 which allows the carriage to make half a step so that the register wheels then stand half way between two of the wheels 210, with the result that said register wheels are out of mesh with said wheels 210 during the return stroke of the operating handle 186.

The motion of the dog rocker under the impulse of the handle 186, is limited by a stop consisting of an arm 235 of one of the brackets 225, said stop lying in the path of the branch 233 above described.

The return stroke of the dog rocker is effected by means of the handle 172 at the extreme latter part of the return stroke of said handle. To this end the arm 232 of the dog rocker has pivoted thereto a link 236 which at its rear end is pivoted to a bell-crank 237, pivoted on a bracket 238 of the frame plate 103. Said bell-crank 237 has a forwardly directed arm in position to be struck by the plate 166 at the end of the return stroke of said plate toward normal position. It will be noted that the return stroke of this plate, carrying with it the handles 164, moves the segments 120 toward the rear of the machine, the extreme last part of the return motion of these devices bringing each of said segments back to the position it occupied when set for the multiplicand. The extreme position for a multiplicand is that corresponding to the digit "9" and it is only when the rack 120 has been moved forward eleven spaces that it can turn the pinion 114. There is thus always a part of the return stroke of the handle 172 during which the said rack 120 is free of the pinions 114 so that a stepping of the carriage at this time would not do any harm. It is preferably during this leeway that the bell-crank 237 is operated.

The register has a frame-work consisting, as here shown, of two end plates 240 secured to the rail or bar that constitutes the main body of the carriage 211; and these end plates are connected together by certain rods or shafts and also by a cover plate 241 secured thereto as by screws 242. Said register comprises a set of ten-toothed pinions 243 adapted to engage the gears 210. The pinions 243 are journaled on a rod 244, which is mounted at its ends in the plates 240. These pinions mesh with idle pinions 245 mounted on a rod 246 and these in turn mesh with other idle pinions 247 mounted on a rod 248, and said pinions 247 operate the numeral wheels 250 by engaging the pinions 251 of said wheels which wheels and pinions are mounted on a rod 252. This train of gearing may be controlled by any suitable detent such for example as the plate spring detent shown at 253 engaging the pinion 243. The numeral wheels 250 can be read through a sight-opening 254 in the casing 241.

The transfer mechanism for this register, as here shown, has a capacity for carrying any number up to and including 4. A series of toothed transfer segments 255 are journaled on a cross rod 256 and each of them is controlled by a positively operating detent 257 engaging between two of the teeth of the segment. Said detent 257 is in the nature of a lever of the first order pivoted on the rod 246 and having a tooth 258 normally resting on the smooth periphery of a drum 260, Figs. 11 and 12, forming part of or secured to the hub of the pinion 243. This drum or disk 260 is of cylindrical outline except that at one point it is formed with a notch 261 into which the tooth 258 can drop once in each rotation of the pinion 243 in order to allow the segment 255 to be turned to the extent of one tooth, such turning having the effect of storing in the segment 255 a unit to be transferred later to the next higher register wheel. The turning of the segment 255 for this purpose is effected by a tooth 262 projecting from the hub of the pinion 243 just to the left of the disk 260. The detents 257 are off-set at their forward ends as shown in Fig. 14 so as to bring said forward ends into the planes of the segments 255 whereas the rear end of each of said detents has to be a little to the right in the plane of the disk 260. In said Fig. 14 only two of the register wheels are shown, the rods 252 and 248 being broken away in their left-hand parts in order better to disclose this transfer mechanism. The construction is such that whenever the pinion 243 passes from its "9" to its "0" position the tooth 262 engages one of the teeth of the segment 255 and turns said segment toward the rear of the machine, the notch 261 reaching the tooth 258 just in time to permit of this turning and said tooth running out of said notch at the end of such turning and locking the segment in its new position. It will be noted in Fig. 14 that this segment is normally in position to engage nothing but the tooth 262 and the detent 257. It will be noted also that the pinion 243 may pass from its "9" to its "0" position a maximum of four times in any one operation of the setting-up mechanism and of the handle 186.

The turning of the register wheels in accordance with the amounts stored up in the segments 255, is effected on the return stroke of the handle 186 at which time, it will be recalled, the register pinions are out of mesh with the gears 210, due to the half step of the carriage. A series of levers 263 are pivoted on a cross rod 264, and each of these levers has a hub 265 (Fig. 14) having a cut-out 266 into which a pin 267 projects from the rod 264, said cut-out and pin allowing to the lever a limited extent of swinging motion. Endwise motion of the lever in one direction is prevented by this pin and in the other direction by a collar 268, a series of such collars being secured by set screws in suitable positions along the shaft. Each of the levers is returned to normal position by means of a spring 270 coiled about the rod 264 and connected at one end to one of the collars 268 and at the other end to the hub 265. Each of the levers 263 includes an arm 271 which, when the lever is swung at its lower end toward the rear, is adapted to strike a pin 272 projecting from the right-hand side of the corresponding segment 255 and to press said pin and with it the segment back to normal position. In Fig. 12 this pin is shown in dotted lines in its normal position, and four operated positions that said pin can occupy are also indicated. The arm 271 is adapted to move underneath the rod 256 and underneath the normal position of the pin 272 and if the segment has been turned so as to move said pin to any one of its said four operated positions, said arm 271 will restore it and thus restore the segment.

Each of the levers 263 also has an arm 273 bent off therefrom toward the right, as best shown in Fig. 14. This arm is adapted to engage the segment 255 before the arm 271 reaches the pin 272, said arm 273 camming said segment toward the left, thus throwing it into engagement with the pinion 245 of the next register wheel train to the left. In order to make this operation possible the segments 255 are loosely mounted on the rod 256 by means of hubs 274, Fig. 14, each of which is normally in contact with a collar 275 rigidly mounted on the rod 256 and against which said hub 274 is pressed by a spring 276 coiled around the rod 256 and compressed between the segment 255 and the next collar 275 to the left. In short this spring holds the segment 255 in its right-hand position where it is in engagement with the detent 257 and in position to be operated by the tooth 262. The first part of the operation of the lever 263, therefore, cams the segment 255 into engagement with the next wheel 245 to the left, after which the arm 271 turns said segment toward the front of the machine a number of tooth-spaces equal to that by which said segment had previously been turned toward the rear by the tooth 262, thus adding on the register wheel of next higher order the amount stored in said segment.

In order to operate the levers 263 one at a time in succession beginning at the extreme right-hand side of the register, each of said levers is formed with a forwardly projecting arm 277 adapted to be struck by an arm 278 rigidly mounted on and projecting from a shaft 280 which shaft is journaled in the plates 240. The construction is such that when the shaft 280 is turned toward the back of the machine, one of these arms 278, engaging one of the arms 277, rocks the lever 263 toward the rear, after which the arm 278 escapes from the arm 277 and allows said lever 263 to be restored to normal position by its spring 270. The arms 278 are spirally distributed along the shaft 280 as will be understood by comparing Figs. 12 and 14, and they are so spaced that the operation of one of the levers 263 will be completed before that of the next one is begun.

The shaft 280 has mounted thereon just inside the right-hand casing plate 240, a detent disk 281, Figs. 12 and 14, having therein a single notch adapted to be engaged by a spring detent 282 secured at 283 to the plate 240. This detent holds the shaft in its normal position but allows it to be turned upon the exertion of any force.

The shaft 280 can be turned upon the return stroke of the handle 186 by any suitable means. In the present instance said shaft has loosely mounted thereon outside the casing 240 a pinion 284 which pinion meshes with a rack 285 projecting toward the rear from the lever 187, said pinion 284 being elongated so as to remain in mesh with the rack in all positions of the carriage. Said rack is capable of imparting slightly more than a complete rotation to the pinion 284 which pinion, it will be understood, is rotated first forward and then backward upon the forward and backward strokes of the handle 186. The motion of the pinion is transmitted to the shaft 280 only in the backward direction and this is effected by any suitable pawl and ratchet mechanism, that which is here shown in Figs. 12, 14 and 15 comprising a pawl 286 pivoted to the end of the pinion 284 and engaging a single notch in an otherwise smooth wheel 287, which wheel is secured, as by a set screw 288, onto the end of the shaft 280. The pawl 286 rides idly over this wheel 287 during the forward stroke of the handle and imparts one complete rotation to the shaft during the return stroke of the handle.

In the present instance I have shown the register equipped with six register wheels and the register carriage is capable of three denominational positions. It will be recalled that the machine is also equipped with three sections 100. This machine, therefore, has a maximum capacity for multiplying a multiplicand of three digits by a multiplier of three digits. It will of course be understood that this capacity can be increased to any desired extent by putting in more sections 100 and by employing a larger register.

The guiding devices comprised within each of the sections 100 can, of course, be modified according to the judgment of the designer of the machine. The plate 105 is here shown with an ear 290, Fig. 2, which can be slightly bent if necessary to guide the segment 141 with precision so as to insure that the slight endwise motion of the rod 153 shall move the pinion 151 out of and the wheel 152 into mesh with said rack.

The means for coupling together and uncoupling the pinions 114 and 114$^a$ of like denomination, in order to allow the former to be turned independently of the latter when the racks 106 are operated, can be of any suitable sort. In the present instance, as shown for example in Figs. 9, 10 and 15, said coupling means consists in pinions 291, each journaled on the end of an arm 292, which arms 292 are rigidly mounted on a rock shaft 293 journaled in the frame plates 103 and 104. Said rock shaft projects through the right-hand frame plate 104 and on its right-hand end there is rigidly mounted an arm 294 having a pin or roller 295 projecting toward the right therefrom. Said roller normally lies in a cam notch 296 in the operating lever 187. A curved arm 297 projects rearward from said lever 187 from just above the notch 296, and the under edge of said arm 297 is in the arc of a circle concentric with the fulcrum 188 of said operating lever. The notch 296 inclines upward toward the front of the machine, and the construction is such that when the lever 187 is in its normal position shown in Fig. 15 the pin 295 is held up by said notch and the arms 292 are held in the position shown in said figure where the pinions 291 are in mesh with the pinions 114 and 114ᵃ. Said pinions 291, as shown in Fig. 9, are each broad enough to lap over and engage one of the pinions 114 and the pinion 114ᵃ of like denomination, with the result that when the parts are in the position shown in Fig. 15 said pinions 114ᵃ and 114 are constrained to turn together; but if the pinions 291 be lifted out of engagement with the pinions 114 and 114ᵃ, then the pinion 114 can be turned by the rack 106 independently of the pinion 114ᵃ. This lifting of the pinions 291 is effected in the initial part of the forward stroke of the handle 186 by means of the incline of the notch 296, the upper edge of which at this time acts as a cam to depress the pin 295 and thereby to elevate the pinions 291; and during the remainder of the forward stroke of said handle said pin is held in its depressed position by the concentric lower edge of the arm 297. The pin is held in its lower position and the pinions 291 in their elevated or inoperative position until the handle 186 has returned almost to its normal position shown in Fig. 15; and said pin is raised by the lower wall of the notch 296 acting as a cam during the extreme last part of the return stroke of the handle. I have shown a stop pin 298 (Fig. 15) to arrest the arm 294 in its lowest position and I have also shown an alining bar 300 supported at its ends in the plates 206 and in such position that when the pinions 291 are elevated said bar engages between two of the teeth of each of said pinions and keeps said pinions in proper position so that when they are dropped down again to their normal position shown in Fig. 15 they will properly engage the pinions 114 and 114ᵃ. Any suitable means can be provided for preventing accidental turning of the pinions 114ᵃ when the pinions 291 are elevated. I have shown detents 301, each consisting of a light wire spring suitably secured to the side of the plate 115 and engaging a pinion 114ᵃ.

It will be perceived that the construction is such that during the time when the multiplier is being set up, if any pinion 114ᵃ is turned by a rack 120 the motion of said pinion will be transmitted to the pinion 114 which will communicate said motion to the gear 210 and to the register wheel of suitable denomination; but when the handle 186 is being operated the pinions 291 are out of engagement and if at this time any pinion 114 is operated by its rack 106 the pinion 114ᵃ will not be turned.

In operation any desired multiplicand within the capacity of the machine is set up by means of the handles 164 in the manner that has been described. The carriage is then set in accordance with the number of digits in the multiplier. If the multiplier contains but one digit the carriage is allowed to remain in its left-hand position; and the multiplier is set up with the handle 172 and the product obtained by an operation of the handle 186. If the multiplier contains two digits the carriage is set back one space and if it contains three digits it is set back two spaces; and of course in a larger machine it might have to be set back a greater distance. The highest digit in the multiplier would then be set up by means of the handle 172, and the handle 186 would be operated. The last part of the forward stroke of said handle would operate the escapement in one direction. After the return stroke of the handle 186 the handle 172 would be returned to normal position with the effect that the stepping of the carriage would be completed. The second digit of the multiplier would then be set up by the handle 172 and the operation completed by a second actuation of the handle 186. These operations would be repeated for each digit of the multiplier.

Much of the mechanism shown, described and claimed herein, is shown and described in a prior application of mine filed June 24, 1914, Serial No. 846,947.

What I claim as new and desire to secure by Letters Patent, is:—

1. The combination of a series of sums elements, one for each of a plurality of denominations, a series of differences elements, one for each of said denominations, means for setting the sums and differences elements of the several denominations each in accordance with one of the digits of a multiplicand having a plurality of digits, and means for setting all of said sums and differences elements in accordance with one digit of a multiplier.

2. The combination of means for setting up in each of a plurality of denominations the several digits of a multiplicand having a plurality of digits, and means for changing said setting in all of said denominations in accordance with a digit of a multiplier so as to produce in each denomination a setting appropriate to the sum of said digit multiplier and that digit of the multiplicand which was set up in that denomination and also a setting appropriate to the difference between the said multiplier digit and the said multiplicand digit of each denomination.

3. The combination of a series of sums elements, one for each of a plurality of denominations, a series of differences elements one for each of said denominations, means for operating the sums element and the differences element in each denomination in accordance with a digit of a multiplicand having a plurality of digits, and means for simultaneously changing in all of said denominations all of said settings in accordance with a digit of a multiplier.

4. The combination of a plurality of denominational sections each containing a sums element and a differences element, means for setting the sums and differences elements in each separate section independently of the other sections to set up the digits of a multiplicand, and means for setting all of said elements in all of the sections in accordance with a multiplier.

5. The combination of a series of sums elements, one for each of a plurality of denominations, a series of differences elements, one for each of said denominations, means for setting up in the several denominations the several digits of a multiplicand having a plurality of digits, means for setting up in all of said denominations a multiplier, a register, means for operating said register in each denomination in accordance with the excess over 10, if any, of the sum of the multiplier and multiplicand in the next lower denomination, and means for operating said register in each denomination in accordance with the difference in that denomination between the principal product corresponding to the sum of the factors and the principal product corresponding to the difference of the factors.

6. The combination of means for setting up in each of a plurality of denominations the digits of a multiplicand having a plurality of digits and for setting up in all of said denominations a digit of a multiplier, a register, means for adding in the said register in any denomination the excess over 10, if any, of the sum of the digital factors of the next lower denomination, means for disconnecting said register from said excess-adding means, and means for operating said register in accordance with the products of the several digital factors where the sums of said factors do not exceed 10 and the products of the complements of said digital factors in any cases where the sum of said digital factors exceeds 10.

7. The combination of a register, a series of sums elements, one for each of a plurality of denominations, a series of differences elements, one for each of said denominations, means for setting up separately the several digits of a multiplicand having a plurality of digits, means for setting up a digit of a multiplier in all of said denominations, means whereby the sums element in any denomination can add into said register in the next higher denomination the excess over 10, if any, of the sum of the digital factors, means for disconnecting said sums element from said register, and means for operating said register in accordance with the products obtained in the several denominations.

8. In a computing machine for multiplying a multiplicand having a plurality of digits by a multiplier, the combination of a series of sums elements, a series of differences elements, and a series of tables of principal products, one of each of said elements for each denomination, means for effecting relative settings of the sums and differences elements and the table of principal products in each denomination in accordance with the corresponding digit of the multiplicand, means for effecting in all denominations a further relative adjustment in accordance with a digit of the multiplier, and operating mechanism for adding in each denomination a product consisting of the difference between two of the products in said table of principal products.

9. The combination of a series of sets of computing devices, one set for each denomination and each set comprising a sums element, a differences element, and a table of principal products, means for setting up in each of said sets a digit of a multiplicand, and means for setting in all of said sets a digit of a multiplier, means for operating said tables of principal products, and a register or indicator operated by such operation.

10. The combination of a series of sets of computing devices, each set comprising as elements thereof a sums element, a differences element and a table of principal products, means for effecting in each set separately a relative adjustment of said elements in accordance with the digits of a multiplicand, means for effecting in all of said sets a relative adjustment of said elements in accordance with a digit of a multiplier, a register, and means for operating said register in accordance with a product determined by said sets of computing devices.

11. The combination of a series of tables of principal products, one table for each denomination, a series of sums elements, a series of differences elements, means for effecting a relative adjustment of the several sums and differences elements and their respective tables of principal products, in accordance with the sums and differences of the respective digits of a multiplicand and a digit of a multiplier, and means for registering the resulting product.

12. The combination of means settable in a plurality of denominations in accordance with the sums of a digit of a multiplier and the several digits of a multiplicand, means settable in said denominations in accordance with the differences of said multiplier digit and said multiplicand digits, and means for registering the product of said multiplier digit and said multiplicand in accordance with the setting of said settable means.

13. The combination of means settable in a plurality of denominations in accordance with the sums of a digit of a multiplier and the several digits of a multiplicand, means settable in said denominations in accordance with the differences of said multiplier digit and said multiplicand digits, and means for registering the differences of the principal products determined by the setting of the first mentioned means and the principal products determined by the setting of the second mentioned means.

14. The combination of a sums element, a differences element, a table of principal products, and coöperating means for obtaining the products of factors from the sums and differences of said factors.

15. The combination of a sums element, a differences element, a table of principal products, and means for effecting relative settings between said table and said sums and differences elements, the first in accordance with the sum and the second in accordance with the difference of two factors.

16. The combination of a sums element, a differences element, and means for moving said two elements together to set up one factor and for reversing the direction of motion of one of said elements to set up the other factor.

17. The combination of means for finding the products of factors whose sums are less than ten, and means for adding in the next higher order an amount equal to the excess, if any, of the sum of two factors over ten.

18. The combination with the stepped device laid off in accordance with the principal products, of means coöperating with said stepped device for determining other products each equal to the difference of two of said principal products.

19. The combination with a register or other indicating means, of means for actuating said register in accordance with the principal product corresponding to the sum of two factors minus the principal product corresponding to the difference of said factors.

20. The combination with a register, of means for adding in one denomination the amount by which the sum of two factors exceeds ten and for adding in the next lower denomination the corresponding product of two factors whose sum is less by said amount than ten.

21. The combination of a sums element, a differences element, a table of principal products, and means for effecting the necessary relative setting of the parts recited, said table of principal products including two stepped series and one of said sums and differences elements comprising two parts for alternative coöperation with said table.

22. The combination of a sums element, a differences element, setting devices including change gear mechanism for moving said sums and differences elements together to set up one factor and for moving said elements in opposite directions to set up the other factor, and means for registering the products of said factors.

23. The combination of means for finding the products of factors whose sums are less in amount that the base of the system of notation, and means for adding in the next higher order an amount equal to the excess, if any, of the sum of the two factors over said base.

24. The combination of a single stepped device, steps of which are laid off according to a rule such that by combining said steps in different ways the several multiplication tables can be found expressed in said steps, and means capable of coöperating with said steps in such different combinations to find the several products.

25. The combination of means for setting up a multiplicand, means for setting up a multiplier, operating means, a register, a register carriage, carriage feed mechanism, and a connection from said setting up means to said carriage feed mechanism.

26. The combination of means for setting up a multiplicand, means for setting up a multiplier, operating means, a register, a register carriage, carriage feed mechanism, and means whereby said carriage feed mechanism is operated in part by said setting-up mechanism and in part by said operating means.

27. The combination of the rack 106, the sums element settably connected with said rack, the actuator having the multiplication table worked out thereon, and the differences element settably mounted on a fixed part.

28. The combination of the rack 106, the sums element connected with said rack, the actuator having lost motion with relation to said sums element, and means for locking said actuator and said rack together when said lost motion is taken up.

29. The combination of the rack 106, the actuator 110, means for affording variable extents of lost motion to said actuator relative to said rack and a motion of said actuator and said rack together, and means for locking said actuator and said rack together when such lost motion has been taken up.

30. The combination of a rack 106, an actuator 110, a lever 123 pivoted on said rack, a track-way for one end of said lever, and means whereby said lever when running on said track-way locks together said rack and said actuator.

31. The combination of an actuator, a rack, means for affording to said actuator with relation to said rack variable amounts of lost motion depending upon the principal products corresponding to the sums of factors, and means for arresting the motion of said actuator variably in accordance with the principal products corresponding to the differences.

32. In a computing machine, a multiplying element comprising a "table of principal products", laid off substantially in accordance with the quarter-squares of integers, substantially as shown and described.

33. In a computing machine, the combination of an element constructed substantially to represent the quarter squares of integers, and relatively movable means for obtaining the differences of selected quarter squares under the control of said element.

34. In a computing machine, the combination of a sums element, a differences element, and a "table of principal products", all arranged to coöperate in accordance with the sums and the differences of factors to obtain the products of said factors, substantially as set forth.

35. The combination of a sums element, a differences element, and coöperating means for obtaining a product from the sum and the difference of the factors.

Signed at the borough of Manhattan, city of New York, in the county of New York and State of New York, this 13th day of April, A. D. 1916.

ROBERT H. STROTHER.

Witnesses:
  E. M. WELLS,
  L. NELSON.